(12) United States Patent
Hayes et al.

(10) Patent No.: US 10,853,311 B1
(45) Date of Patent: Dec. 1, 2020

(54) ADMINISTRATION THROUGH FILES IN A STORAGE SYSTEM

(71) Applicant: Pure Storage, Inc., Mountain View, CA (US)

(72) Inventors: John Hayes, Mountain View, CA (US); Robert Lee, Mountain View, CA (US); Peter Vajgel, Mountain View, CA (US); Par Botes, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 1496 days.

(21) Appl. No.: 14/323,865

(22) Filed: Jul. 3, 2014

(51) Int. Cl.
*G06F 7/00* (2006.01)
*G06F 16/11* (2019.01)

(52) U.S. Cl.
CPC .................................. *G06F 16/11* (2019.01)

(58) Field of Classification Search
CPC ........................... G06F 17/30171; G06F 16/11
USPC ...................................................... 707/827
See application file for complete search history.

(56) References Cited

U.S. PATENT DOCUMENTS

| | | | | |
|---|---|---|---|---|
| 6,061,057 A | * | 5/2000 | Knowlton | G06F 16/954 715/744 |
| 6,725,392 B1 | | 4/2004 | Frey et al. | |
| 6,925,595 B1 | * | 8/2005 | Whitledge | G06F 16/9577 715/234 |
| 7,330,862 B1 | * | 2/2008 | Srinivasan | G06F 12/0866 |
| 7,401,093 B1 | * | 7/2008 | Hamilton | G06F 16/128 |
| 7,721,062 B1 | * | 5/2010 | Fair | G06F 16/10 711/170 |
| 7,778,960 B1 | | 8/2010 | Chatterjee et al. | |
| 7,783,611 B1 | * | 8/2010 | Hamilton | G06F 16/1865 707/690 |
| 7,827,201 B1 | * | 11/2010 | Gordon | G06F 16/289 707/792 |
| 7,908,448 B1 | | 3/2011 | Chatterjee et al. | |
| 8,010,485 B1 | | 8/2011 | Chatterjee et al. | |
| 8,010,829 B1 | | 8/2011 | Chatterjee et al. | |

(Continued)

OTHER PUBLICATIONS

Storer, Mark W., Greenan, Kevin M., Miller L. Ethan, Voruganti, Kaladhar; Pergamum: Replacing Tape with Energy Efficient, Reliable, Disk-Based Archival Storage.

(Continued)

*Primary Examiner* — Eliyah S. Harper
(74) *Attorney, Agent, or Firm* — Womble Bond Dickinson (US) LLP

(57) ABSTRACT

A method for administration through files in a storage cluster is provided. The method includes distributing user data, including files, throughout a plurality of storage nodes having non-volatile solid-state memory, through erasure coding. The plurality of storage nodes are housed within a single chassis that couples the storage nodes as the storage cluster. The method includes receiving at the storage cluster a command to write a file or read a file, the file having a filename. The method includes determining whether the filename is reserved and determining an administrative action according to the file, responsive to determining that the filename is reserved. The method includes initiating the administrative action. A storage system is also provided.

20 Claims, 6 Drawing Sheets

(56) References Cited

U.S. PATENT DOCUMENTS

| | | | |
|---|---|---|---|
| 8,041,888 B2* | 10/2011 | Rajan | G06F 16/10 711/112 |
| 8,046,548 B1 | 10/2011 | Chatterjee et al. | |
| 8,086,911 B1 | 12/2011 | Taylor | |
| 8,145,838 B1 | 3/2012 | Miller et al. | |
| 8,180,983 B1* | 5/2012 | Jernigan | G06F 3/061 707/827 |
| 8,244,999 B1 | 8/2012 | Chatterjee et al. | |
| 8,327,080 B1 | 12/2012 | Der | |
| 8,479,037 B1 | 7/2013 | Chatterjee et al. | |
| 8,498,967 B1 | 7/2013 | Chatterjee et al. | |
| 8,522,073 B2 | 8/2013 | Cohen | |
| 8,595,455 B2 | 11/2013 | Chatterjee et al. | |
| 8,627,136 B2 | 1/2014 | Shankar et al. | |
| 8,700,875 B1 | 4/2014 | Barron et al. | |
| 9,135,457 B1* | 9/2015 | Arnaudov | G06F 21/604 |
| 2003/0084026 A1 | 5/2003 | Jameson | G06F 16/10 |
| 2004/0030668 A1* | 2/2004 | Pawlowski | G06F 3/0664 |
| 2004/0030822 A1* | 2/2004 | Rajan | G06F 3/0665 711/4 |
| 2005/0256845 A1* | 11/2005 | Jen | G06F 16/40 |
| 2006/0179261 A1* | 8/2006 | Rajan | G06F 16/10 711/162 |
| 2007/0208748 A1* | 9/2007 | Li | G06F 17/30206 |
| 2007/0239793 A1* | 10/2007 | Tyrrell | G06F 16/10 |
| 2008/0295118 A1 | 11/2008 | Liao | |
| 2009/0019047 A1* | 1/2009 | Anderson | G06F 16/1774 |
| 2010/0268908 A1 | 10/2010 | Ouyang et al. | |
| 2012/0266057 A1* | 10/2012 | Block | G06F 40/14 715/202 |
| 2013/0060884 A1 | 3/2013 | Bernbo et al. | |
| 2013/0073894 A1 | 3/2013 | Xavier et al. | |
| 2013/0219024 A1* | 8/2013 | Flack | H04L 67/02 709/219 |
| 2013/0339818 A1* | 12/2013 | Baker | G06F 3/0667 714/E11.034 |
| 2014/0047263 A1 | 2/2014 | Coatney et al. | |
| 2014/0082513 A1* | 3/2014 | Mills | H04L 41/069 715/744 |
| 2014/0136880 A1 | 5/2014 | Shankar et al. | |

OTHER PUBLICATIONS

Hang, Kai, Jin, Hai, Ho, Roy; RAID-x: A New Distributed Disk Array for I/O-Centric Cluster Computing.

* cited by examiner

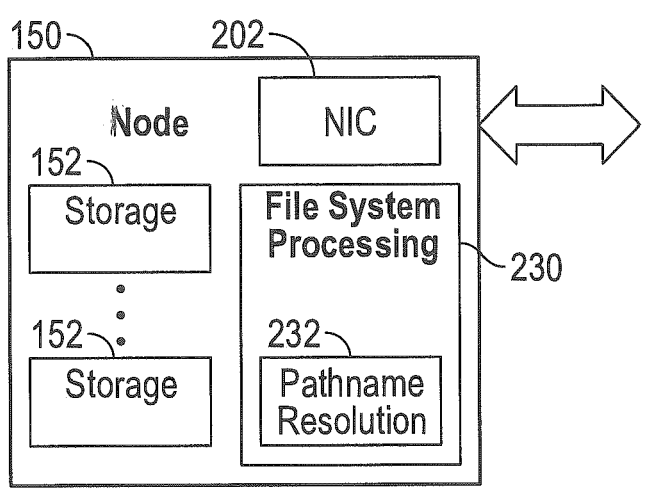
FIG. 4
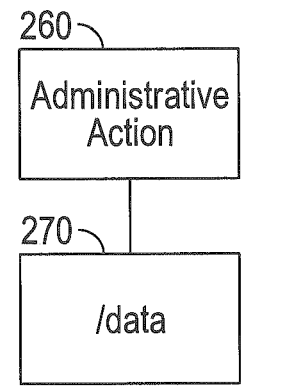
/data/admin/snapshot
272
FIG. 5
Root Directory/Directory1/Directory2/Directory3/Directory4
　　　　　　　　　/Filename1　　　/Filename3　　⎫ Filenames
　　　　　　　　　/Filename2　　　/Filename4　　⎬ in
　　　　　　　　　/Reserved_Name1 /Reserved_Name2⎭ Namespace
　　　　　　　　　　　　　　　　　　　　　　　　　　236
　　　　　　　　　　　　　　　　　　　　234
　　　　　　　　　　　　Namespace
FIG. 6
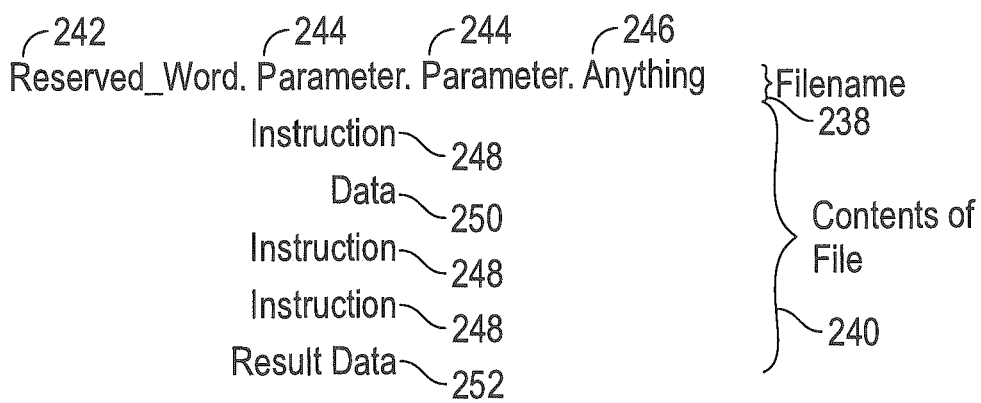
FIG. 7

ADMINISTRATION THROUGH FILES IN A STORAGE SYSTEM

BACKGROUND

Administrative actions, such as taking a snapshot of data or generating reports relating to data in a storage system, are typically requested and commenced using a specific administrative access, a communication protocol, and a communication path separate from ordinary user access to the storage system. This typically leads to a separate communication and authentication path, and a new administrative role, which must be defined, authorized and tracked. In current systems where a storage unit is separate from a host running an application, various communications protocols allow an application to interact with a storage unit in order to request an administrative action such as a snapshot. The above separations are not readily overcome by standard hard disk drives (HDDs) and protocols as applied to present storage systems. Solid-state memory, such as flash, is currently in use in solid-state drives (SSD) to augment or replace conventional hard disk drives (HDD), writable CD (compact disk) or writable DVD (digital versatile disk) drives, collectively known as spinning media, and tape drives, for storage of large amounts of data. Flash and other solid-state memories have characteristics that differ from spinning media. Yet, many solid-state drives are designed to conform to hard disk drive standards for compatibility reasons, which makes it difficult to provide enhanced features or take advantage of unique aspects of flash and other solid-state memory.

It is within this context that the embodiments arise.

SUMMARY

In some embodiments, a method for administration through files in a storage cluster is provided. The method includes distributing user data, including files, throughout a plurality of storage nodes having non-volatile solid-state memory, through erasure coding. The plurality of storage nodes are housed within a single chassis that couples the storage nodes as the storage cluster. The method includes receiving at the storage cluster a command to write a file or read a file, the file having a filename. The method includes determining whether the filename is reserved and determining an administrative action according to the file, responsive to determining that the filename is reserved. The method includes initiating the administrative action, wherein at least one method operation is performed by a processor. A storage system is also provided.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a block diagram of a storage node having filesystem processing and pathname resolution in accordance with some embodiments.

FIG. 5 is a symbolic action diagram, showing an administrative action initiated via a reserved filename in a filesystem namespace in accordance with some embodiments such as the storage node of FIG. 4.

FIG. 6 is a namespace diagram, showing regular filenames and reserved filenames in accordance with some embodiments.

FIG. 7 is a diagram of a reserved filename, showing variations thereof in accordance with some embodiments.

DETAILED DESCRIPTION

Figure 1:
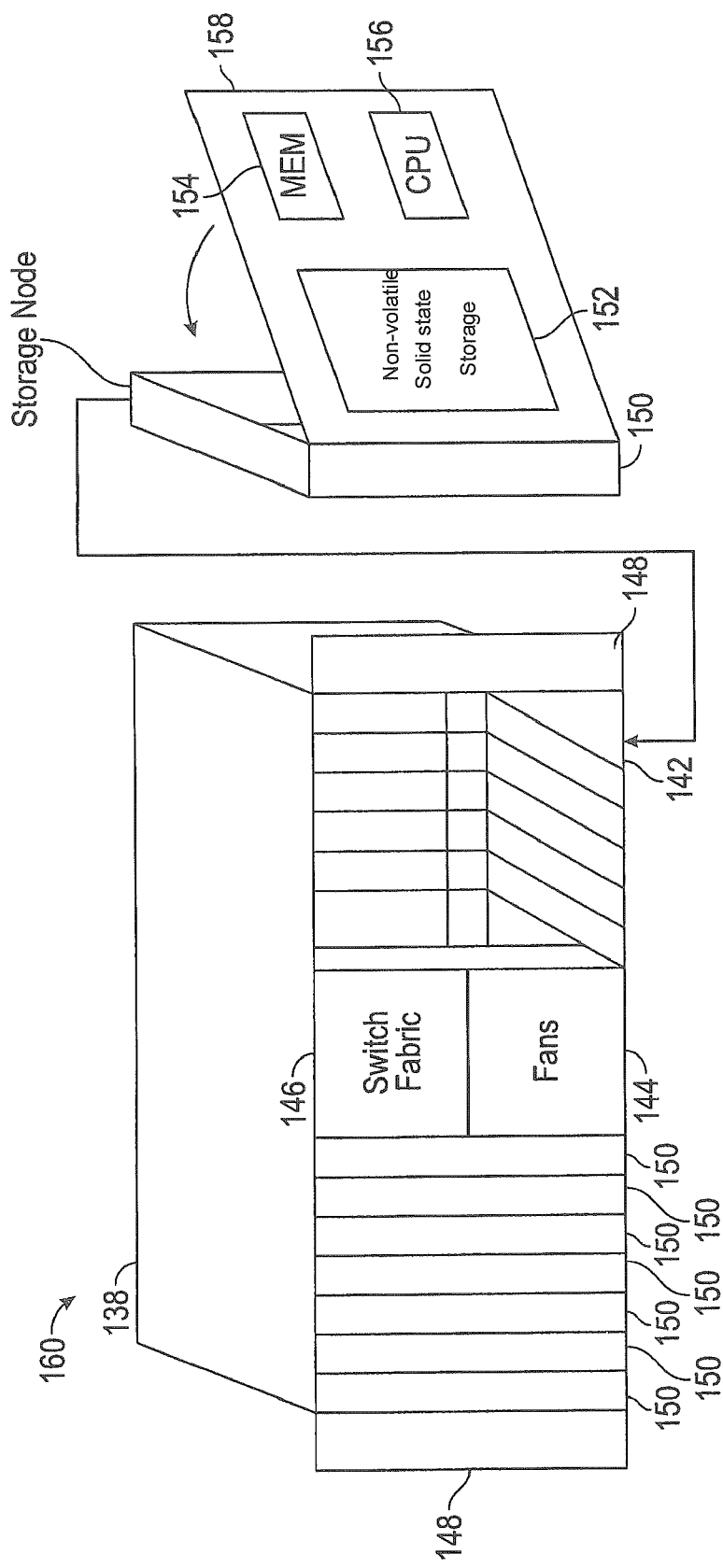
FIG. 1 is a perspective view of a storage cluster with multiple storage nodes and internal storage coupled to each storage node to provide network attached storage, in accordance with some embodiments.

The embodiments below describe a storage cluster that stores user data, such as user data originating from one or more user or client systems or other sources external to the storage cluster. The storage cluster distributes user data across storage nodes housed within a chassis, using erasure coding and redundant copies of metadata. Erasure coding refers to a method of data protection in which data is broken into fragments, expanded and encoded with redundant data pieces and stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster is contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of the many features and capabilities of embodiments of storage nodes disclosed herein is administration through files in a storage system. Reserved names in a namespace are used, along with read and write mechanisms, to dynamically perform administrative control, auditing and reporting, without requiring a sideband I/O path. A user or an administrator can request and trigger an administrative action by writing a file, with a reserved filename, to the file space in a storage system, or reading a file with a reserved filename, using the same filesystem resources as when writing an ordinary file.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2:
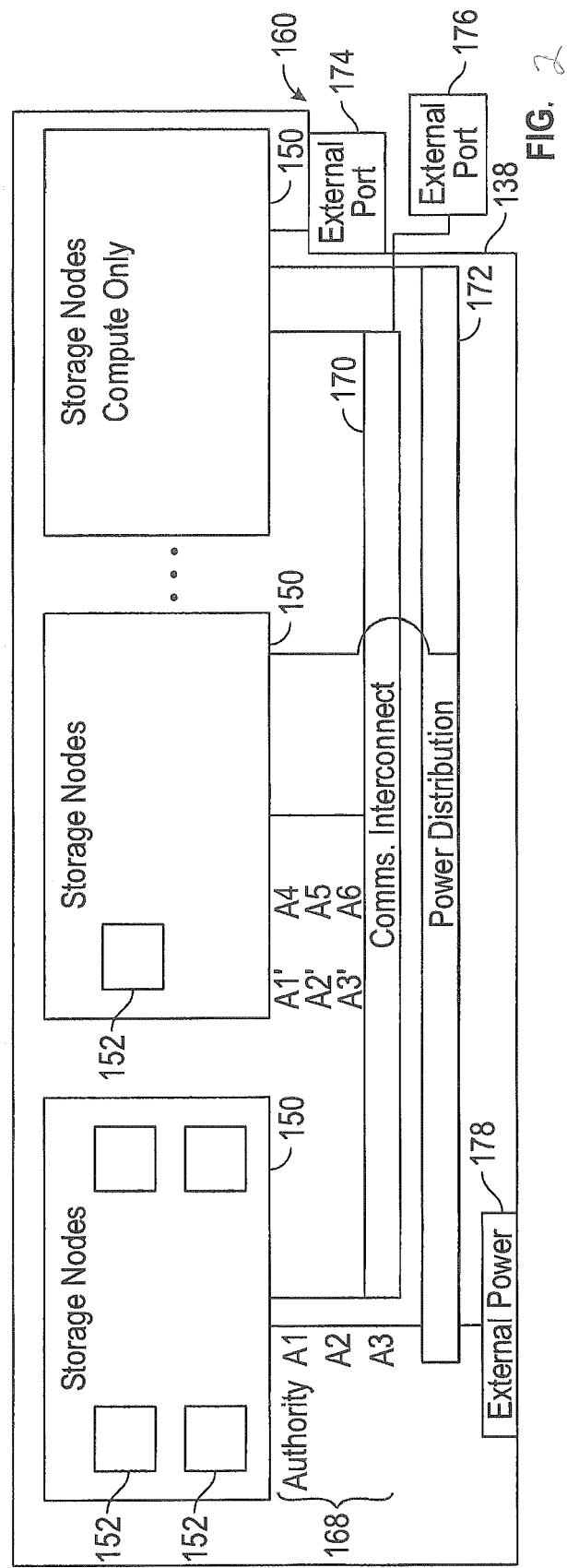
FIG. 2 is a block diagram showing a communications interconnect coupling multiple storage nodes in accordance with some embodiments.

FIG. 2 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 2, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid state storage 152. In addition, one or more storage nodes 150 may be a compute only storage node. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

Two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain metadata, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top is the directory entries (file names) which link to an inode. Modes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudorandomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using an Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being replicated. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

In addition to component redundancy in the communication channel, storage cluster 160 is configured to allow for the loss of one or more storage nodes 150. In some embodiments this cluster redundancy level may be one for relatively small storage clusters 160 (less than 8 storage nodes 150) and two for relatively larger storage clusters 160 (8 or more storage nodes 150) although any number would be suitable for the cluster redundancy level. In some embodiments, where more storage nodes 150 than the redundancy level are lost, the storage cluster 160 cannot guarantee availability of data or integrity of future updates. As mentioned above, data redundancy is implemented via segments. A segment is formed by selecting equal sized shards from a subset of the non-volatile solid state storage 152, each within a different storage node 150. Shards are reserved to establish the redundancy level, e.g., one or two, and then a remainder constitutes the data (the data shards). The shards are encoded using an ECC scheme such as parity or Reed-Soloman (RAID 6), so that any subset of the shards equal in count to the data shards may be used to reconstruct the complete data. The storage cluster redundancy represents a minimum level of redundancy and it may be exceeded for any individual data element. Segments are stored as a set of non-volatile solid state storage units, roles (data position or parity) and allocation unit local to each non-volatile solid state storage unit. The allocation units may be a physical address or an indirection determined within the non-volatile solid state storage 152. Each shard may be portioned into pages and each page into code words. In some embodiments, the pages are between about 4 kilobytes (kB) and 64 kB, e.g., 16 kB, while the code words are between about 512 bytes to 4 kB, e.g., 1 kB. These sizes are one example and not meant to be limiting as any suitable size for the code words and the pages may be utilized. The code words contain local error correction and a checksum to verify the error correction was successful. This checksum is "salted" with the logical address of the contents meaning that a failure to match the checksum may occur if the data is uncorrectable or misplaced. In some embodiments, when a code word fails a checksum it is converted to an "erasure" for purpose of the error correction algorithm so that the code word may be rebuilt.

Figure 3:
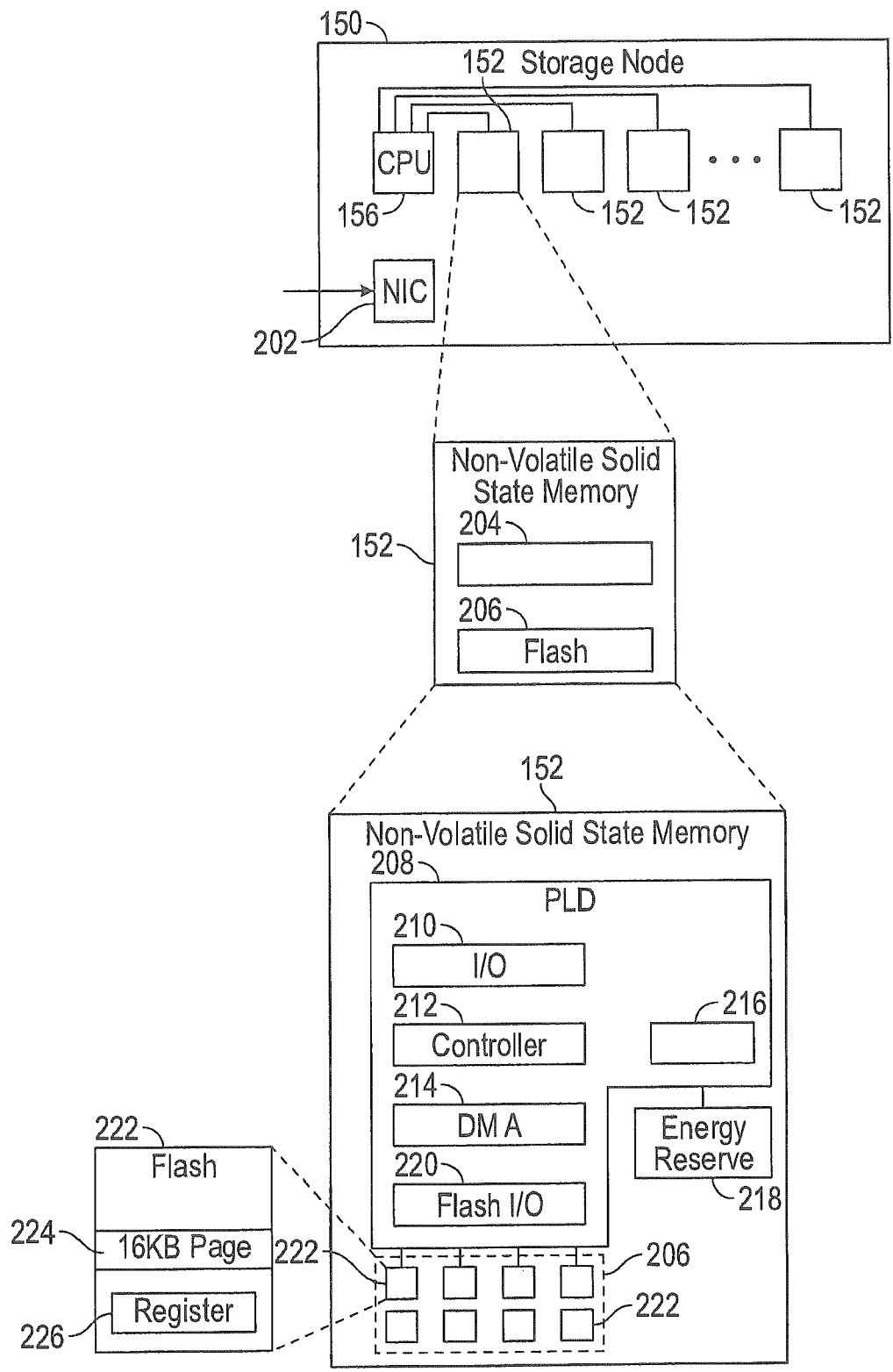
FIG. 3 is a multiple level block diagram, showing contents of a storage node and contents of one of the non-volatile solid state storage units in accordance with some embodiments.

FIG. 3 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 3, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 3, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

The above embodiments of storage nodes 150 and non-volatile solid-state storages 152 are suitable for inclusion of features discussed below to provide administration through files in a storage system. These embodiments apply reserved filenames to initiate administrative actions. As one illustration, a user or an administrator may desire to have a storage system perform a snapshot, generate a report, or perform another administrative action. In typical systems, the user or administrator would issue a request to perform the administrative action through a command path, such as a command line interpreter, an application programming interface (API) or a graphical user interface (GUI). Access to the command path would typically require authentication. In the embodiments below the user or administrator issues the request to perform the administrative action in the form of a reserved filename.

FIG. 4 is a block diagram of an embodiment of a storage node 150 having filesystem processing and pathname resolution in accordance with some embodiments. Storage node 150 has one or more non-volatile solid-state storages 152, into which files can be written, and a network interface controller 202, which couples to a network. Communication to and from the storage node 150, particularly for writing files into and reading files out of the non-volatile solid-state storage(s) 152, is via the network and the network interface controller 202. The storage node 150 has a filesystem processing unit 230, which has a pathname resolution unit 232. When a request to write a file or read a file arrives at the storage node 150 via the network interface controller 202, the filesystem processing unit 230 processes the request. The filesystem processing unit 230 could be implemented as a software module executing on the CPU 156 of the storage node 150 as shown in FIG. 3. In alternative embodiments the filesystem processing unit 230 could be implemented as a hardware module or a firmware module, or combinations thereof. In some embodiments, the filesystem processing unit 230 and/or the pathname resolution unit 232 is implemented in a non-volatile solid-state storage 152 of the storage node 150. The storage node 150 applies the pathname resolution unit 232 to resolve the pathname for the file, according to the filesystem. The pathname resolution unit 232 determines where in a directory structure the file should be written in some embodiments.

Various filesystems have various directory structures, including directories, subdirectories, rules for filenames, and a namespace. One of the tasks of the pathname resolution unit 232 is to look for reserved names in accordance with present embodiments. One of the tasks of the filesystem processing unit 230 is to initiate various administrative actions in accordance with the reserved filenames. These tasks can be performed using parsing, and comparison to a list or other formatted data, in which aspects of the reserved filenames are represented. For example, a request to write a file or read a file could be processed by the filesystem processing unit 230. If the pathname resolution unit 232 determines that the filename of the file does not include a reserved filename, the filesystem processing unit 230 instructs the appropriate non-volatile solid-state storage(s) 152 to store the file in the appropriate location, or read the file from the appropriate location, in the directory structure. The processing of an ordinary command to read or write a file. The storage node 150 could apply data striping across multiple non-volatile solid-state storages 152 when storing the file. If the pathname resolution unit 232 determines that the filename of the file does include a reserved filename, the filesystem processing unit 230 initiates the appropriate administrative action.

In some embodiments, when the command is to write a file with a reserved filename, the filesystem processing unit 230 instructs the appropriate non-volatile solid-state storage(s) 152 to store the file, with the reserved filename, in the appropriate location in the directory structure. In other embodiments, the file, with the reserved filename, is not stored, but results of the appropriate administrative action are stored in the appropriate non-volatile solid-state storage(s) 152. Both the file, with the reserved filename, and the results of the appropriate administrative action are stored in some embodiments.

In some embodiments, when the command is to read a file with a reserved filename, the file should have been stored in a previous action, and the filesystem processing unit 230 determines whether or not the file exists in the appropriate location in the directory structure. In other embodiments, the file does not need to exist in the appropriate location in the directory structure. For both cases, the command to read the file initiates the appropriate administrative action. The existence of the file in the directory structure could modify the administrative action, as further described below. The lack of existence of the file could trigger an error message, or the administrative action could proceed without the file itself, e.g., using default parameters.

The pathname resolution unit 232 may reside at the entrance of the filesystem processing unit 230 to process pathnames of incoming files upon arrival and detect reserved words in the filename. In further embodiments, the filesystem processing unit 230 includes a type of crawler, and looks at filenames in the filesystem, finding files that have been written to the non-volatile solid-state storage(s) 152 and determining if any of those files have reserved filenames (i.e., reserved words in the filenames).

FIG. 5 is a symbolic action diagram, showing an administrative action 260 initiated via a reserved filename in a filesystem namespace in accordance with some embodiments. The administrative action 260 is symbolically inserted into the file space 270, and the result 272 appears in the file space. In the example shown, the file space 270 has a directory structure, and the administrative action 260, e.g., a snapshot, is requested by writing a file with a reserved filename to a location in the directory structure under the directory "/data". As a particular example, the reserved filename "snapshot" is written to the "admin" directory, which is under the "data" directory. The storage system then initiates a snapshot of the data stored in the storage system, and posts the results in the file named "snapshot". Examples of administrative actions 260 include a snapshot, a virus check, a file backup, a file difference summary, a report, an audit, expiring obsolete data, configuring export points, managing permissions, managing quotas, etc. In some embodiments, upon completion of the administrative action 260 the storage system writes a completion indication to the file with the reserved filename, or deletes the file with the reserved filename, so that the administrative action 260 is not repeated. Posting of results of the administrative action 260 can act as the completion indication, in some embodiments. The file with the reserved filename may be left in place in the file space 270, and the administrative action 260 is repeated, e.g., a virus scan, a snapshot or a backup, which could be repeated at regular intervals or according to a schedule included in the contents of the file. Reading the file with the reserved filename may trigger a repetition of the administrative action. In some embodiments, reading a file with a reserved filename triggers an administrative action, even if the file does not actually exist. For example, reading a file with the filename having the reserved word "query" or "report" could trigger a query or a report. Further types of administrative actions 260, reserved filenames, directory structures, and locations to write within a directory, are readily devised in accordance with the teachings herein.

FIG. 6 is a namespace diagram, showing regular filenames and reserved filenames as filenames in a namespace 236, in accordance with some embodiments. Illustrated herein are examples of names of directories and files which could be found in a namespace 234. The namespace 234 is in a directory structure according to a filesystem. For example, proceeding from a root directory "ROOT DIRECTORY" to subdirectories, the example directory tree shows the hierarchy: "ROOTDIRECTORY/DIRECTORY1/DIRECTORY2/DIRECTORY3/DIRECTORY4". Ordinary filenames such as "FILENAME1", "FILENAME2", "FILENAME3", "FILENAME4", etc., are co-mingled with, intermingled with and coexist with reserved filenames such as "RESERVED NAME1", "RESERVED NAME2", etc. at various levels in the directory structure. The namespace 234 allows for various possibilities of filenames, some reserved, some not, and the various possibilities of filenames can be intermingled at various levels in a directory structure. In addition, reserved filenames for the embodiments described are not limited to a particular location in memory, such as a system file location. In some embodiments, the administrative action 260 applied according to a reserved filename is applied to files at the same level in the directory structure as the level at which the reserved filename is encountered by the storage node 150, e.g., by the filesystem processing unit 230 and pathname resolution unit 232. The administrative actions may apply to files at the same level or below. In some embodiments, the administrative actions apply to files at levels specified or inferred from the reserved filename 238, parameters 244 in the reserved filename 238, or data 250 stored under that reserved filename.

FIG. 7 is a diagram of a reserved filename 238, showing variations thereof in accordance with some embodiments. Various formats for a reserved filename 238 can be devised in accordance with the teachings herein. In this example, reserved filename 238, a reserved word 242 such as "RESERVED WORD" in the filename 238 is recognized as indicating that the filename 238 is a reserved filename 238. The remainder of the reserved filename 238 could include one or more parameters 244, and/or unrestricted verbiage, i.e., a non-reserved word 246, such as "ANYTHING". The non-reserved word 246 is discretionary according to the user or administrator. Various sequences and orderings of reserved words 242 and/or parameters are readily devised. Various separators (such as the dot character illustrated herein, a space character, an underscore character, no spaces, numbers, the asterisk character and so on) between reserved words 242, unreserved words 246 and/or parameters 244 are readily devised. A reserved filename 238 could be itself entirely a reserved word 242, or could include a reserved word 242 in combination with one or more unreserved words 246 and/or one or more parameters 244, with or without separators, in various orders. The pathname resolution unit 232 could extract parameters 244 from the filename 238, which are then applied to the administrative action. The phrases employed in this example are illustrative, and that specific phrases having readily discernible meaning in the context of administrative actions 260 can be substituted for the generic phrases applied herein, as could code phrases, etc. In some embodiments, various character sequences could be applied, as the reserved word is not required to be a regular dictionary word or syllable. The reserved filename 238 could be entirely a reserved word 242 or could include a reserved word 242 and other characters, syllables, symbols, etc.

One use of a parameter 244 is to indicate a particular type of formatting for results of the administrative action. For example, the results of a report or a snapshot could be formatted to suit another operating system, filesystem, application, database or other requirement differing from the environment in which the storage node 150 operates. Another use of a parameter 244 is to indicate a time span or a date over which the administrative action 260 applies. For example, if the administrative action 260 is a report, a backup, a culling of files, or a virus scan, the action could take place on files newer than or older than a date specified by a parameter 244, or could take place on files that were written during the specified time span. One use of a parameter 244 is to indicate a delay, so that the administrative action 260 occurs after the specified delay or on a specified date or time. As a further example, the administrative action 260 could take place in two parts, one part immediately, and a follow-up part after the specified delay or on the specified date or time. The contents of the file 240 having the reserved filename 238 could be null, in a case where the reserved filename 238 conveys sufficient information in order to request and trigger an administrative action 260. In some embodiments, the contents of the file 240 could include data 250, which could be applied to the administrative action 260 or could include result data 252, which could be appended to the instructions 248, or could replace the instructions 248.

Various features of embodiments are discussed below. Reserved filenames 238 can be intermingled with regular filenames in a namespace 234, a file space and/or a directory structure, in some embodiments. Access, for writing a reserved filename 238, can be controlled by directory permissions, in some embodiments. For example, a specific directory could have directory permission set for selected individuals, machines or applications, and these entities can then write regular files (i.e., non-reserved filenames) or reserved filenames 238, requesting administrative actions 260, to this specific directory. Entities for whom directory permission is not set cannot write to that specific directory and thus cannot write reserved filenames 238 to that specific directory.

As mentioned above, administrative actions 260 requested by reserved filenames 238 can have access to files at the same level in a directory structure as the reserved filename is written, or below, in some embodiments. The administrative actions 260 are prevented from performing on a level above the directory in which the file with the reserved filename is written in some embodiments. Thus, the permission of the directory governs the administrative action. This is particularly useful in a tenanted directory structure, where data owners are given access to specified directories, and can request administrative actions 260 by writing to those specified directories according to the permissions of the directories. Administrative actions 260 would be prevented for directories above the permitted directory, or adjacent to the permitted directory (i.e., at the same level as the permitted directory in a directory tree), provided those directories do not grant access. Directory permission controls permission to request the administrative action, in some embodiments.

Data access and administrative access are unified over a single authenticated I/O path, in some embodiments. For example, the single authenticated I/O path is the path over which regular files are written to the storage, and the reserved filenames 238 (requesting administrative action) are written to the storage on the same path, i.e., the network access in accordance with the filesystem. Both data access and administrative actions occur over the network and via the filesystem, in some embodiments.

Examples of administrative actions 260 are described below. These examples are not limiting, and serve to illustrate the flexibility of the above embodiments. In one example, an application creates a file as "/admin::Iridium/Snapshots/MyAppSnapshot". Once the file create returns successfully, the application is guaranteed that a snapshot has been taken. In one example, a user or an administrator creates a file as "shared directory/my_directory/virus_scan", which initiates a virus scan of all files under "my_directory". In another example, a user or an administrator creates a file as "tenant storage/company_A/backup", which initiates a backup of all files under the directory "company_A". In further examples, a user or an administrator creates a file that initiates an action such as a report or an audit. In another example, a user or an administrator creates a file that causes obsolete data to expire. A parameter 244 in the reserved filename could indicate whether or not a report is to be generated from this action, e.g., to show which files are deleted as expired. In some embodiments, parameter 244 in the reserved filename 238 could indicate a date, so that files older than that date are obsoleted. In one example, the reserved name includes a reserved word such as "PS1" to indicate Microsoft power shell XML (extensible markup language) like structures, "CSV" to indicate a comma separated list, or "AWS" to indicate Amazon Web Services, and thus provides a hint for how data is formatted. In one example, the contents of the file with a reserved filename 238 include scripting. The scripting can be written in an application environment, inserted in the file, and the file can then be written using file I/O methods.

In one example, tenants could have subdirectories of parent directories. Since the administrative user of the tenant has access to the instantiation of the reserved namespace, the administrative user can perform full administrative tasks without a storage administrator having to create a separate administrative role and login to the administrative environment or console. In one example, integration of the filesystem with reporting systems for audits is achieved through use of the reserved filenames 238. An administrator could thus query a namespace for all files that have changed since a specified date or all files that have changed over a recent interval, and this could be integrated with audit-style applications.

The administrative actions initiated through use of reserved filenames 238 are available via network filesystem technologies and are thus exportable. In one example, a relationship between storage data and representative operations or states of that data is maintained by intermingling the storage data and the reserved filenames 238 that trigger administrative actions 260. The filenames having reserved words in a namespace support administrative control against a storage subsystem from a differing computer across a network filesystem. Data access and administrative access may be unified over a single authenticated I/O path, which eliminates a secondary access mechanism for administrative or application access. In one example, a portion of a filename triggers interpretation of the reserved filename 238 as a request for an administrative action 260.

Figure 8:
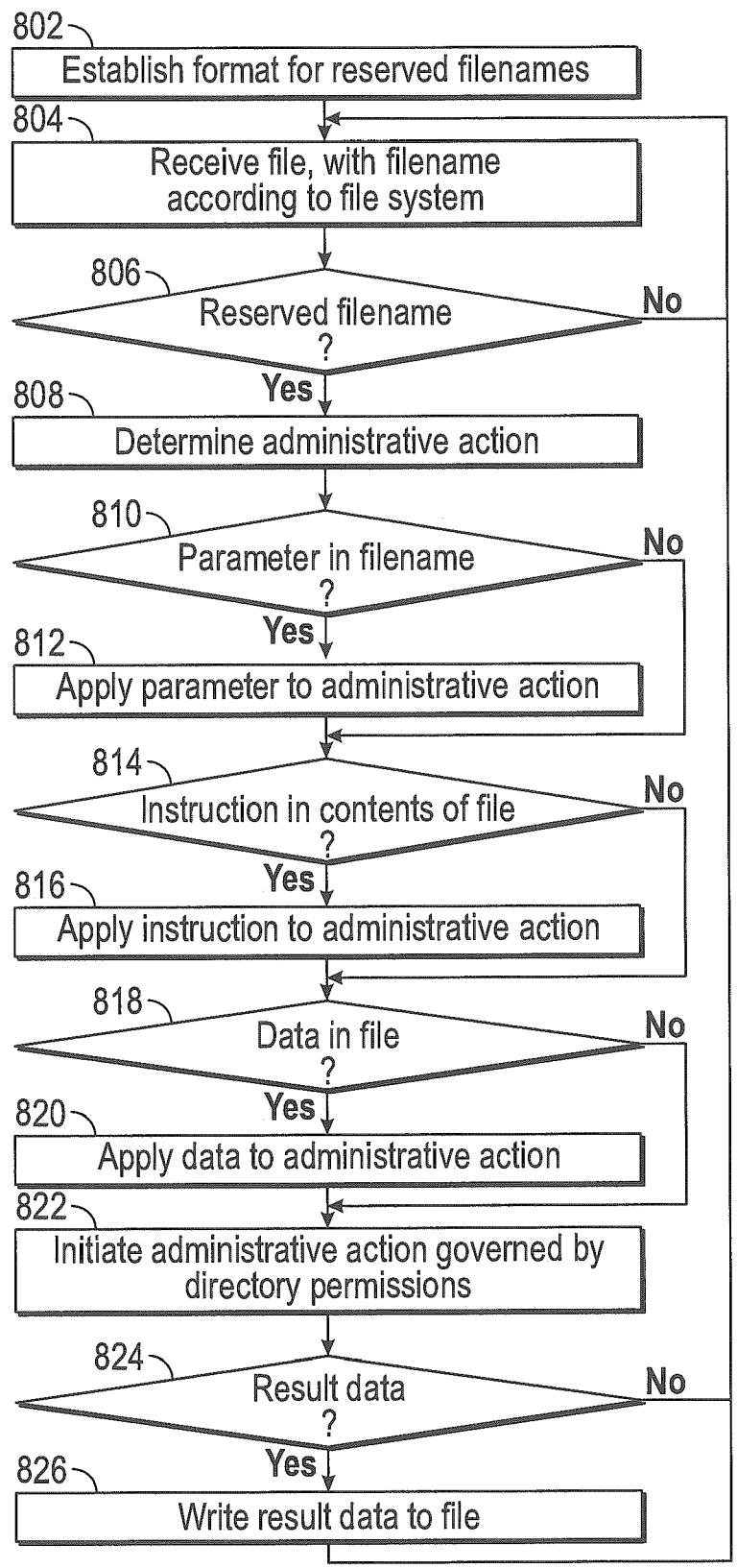
FIG. 8 is a flow diagram of a method for administering through files, which can be practiced on or by embodiments of the storage cluster, storage nodes and/or non-volatile solid-state storages in accordance with some embodiments.

FIG. 8 is a flow diagram of a method for administering through files, which can be practiced on or by embodiments of the storage cluster 160, storage nodes 150 and/or non-volatile solid-state storages 152 disclosed herein, as well as other types of storage. Many of the actions described in the method can be performed by one or more processors, such as processors on storage nodes 150 and/or processors in non-volatile solid-state storages 152 in some embodiments. In an action 802, a format is established for reserved filenames. Various formats are discussed above and are readily devised in accordance with the teachings herein.

In an action 804 a command to write a file or to read a file is received. The file has a filename according to a filesystem. For example, the command to write or read the file is received at a storage system via a network coupled to the storage system, for storage in the storage system. In a decision action 806, the question is asked, is the filename a reserved filename? For example, a pathname resolution unit could look for a reserved word in the filename and, upon finding such, declare that the filename is a reserved filename. If the answer is no, flow branches to the action 808. In the action 808, the ordinary command to write a file or to read a file is processed. After the action 808, flow branches back to the action 804, to receive another command to write a file or to read a file. If the answer is yes, the filename is a reserved filename, flow proceeds to the action 810. In the action 810, an administrative action is determined. This administrative action is based on the reserved filename. For example, a reserved word in the filename could trigger interpretation of the filename as a reserved filename, from which the administrative action is determined.

The method advances to decision action 812, where it is determined if there is a parameter in the filename. If the answer is no, flow branches to the decision action 816. If the answer is yes, flow proceeds to the action 814. In the action 814, the parameter is applied to the administrative action. For example, the parameter could indicate a time span or a date over which a report, a backup, a culling of files, or a virus_scan, applies as the administrative action, or the parameter could indicate a delay applicable to a portion or all of the administrative action, or a type of formatting to be applied to results.

In a decision action 816 it is determined if there is an instruction in the contents of the file. If the answer is no, flow branches to the decision action 820. If the answer is yes, flow proceeds to the action 818. In the action 818, the instruction is applied to the administrative action. For example, the contents of the file could include a single instruction or a script having multiple instructions, which could direct the administrative action. In a decision action 820, it is determined if there is data in the file. If the answer is no, flow branches to the action 824. If the answer is yes, flow proceeds to the action 822. In the action 822, the data is applied to the administrative action. For example, the data could supply information that goes into a report generated according to the administrative action and the data could provide one or more parameters, and so on.

The method advances to action 824 where the administrative action is initiated. The administrative action is governed by directory permissions, in some embodiments. In the decision action 826, the question is asked, is there result data? For example, the administrative action could generate a report, a summary, a warning, an error message or a recommendation. If the answer is no, flow branches back to the action 804, to receive another command to write a file or to read a file. If the answer is yes, flow proceeds to the action 828. In the action 828, the result data is written to the file. Flow then proceeds back to the action 804, to receive another file. In variations of the method, the decision actions 812, 816, 820 regarding contents of the file or the filename could be performed in various orders.

Figure 9:
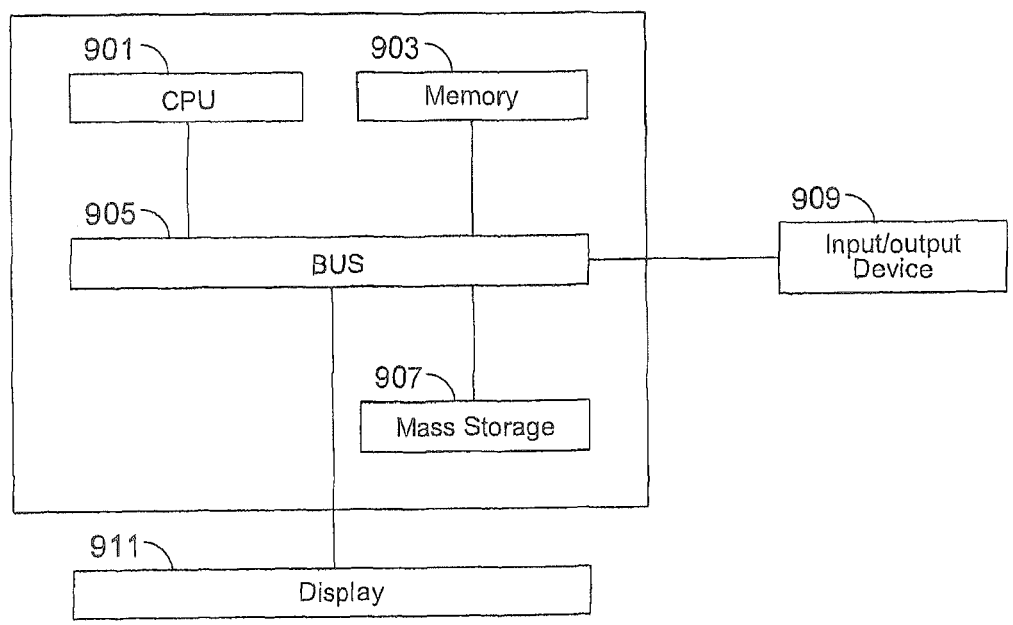
FIG. 9 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 9 is an illustration showing an exemplary computing device which may implement the embodiments described herein. The computing device of FIG. 9 may be used to perform embodiments of the functionality for a storage node or a non-volatile solid state storage in accordance with some embodiments. The computing device includes a central processing unit (CPU) 901, which is coupled through a bus 905 to a memory 903, and mass storage device 907. Mass storage device 907 represents a persistent data storage device such as a disc drive, which may be local or remote in some embodiments. The mass storage device 907 could implement a backup storage, in some embodiments. Memory 903 may include read only memory, random access memory, etc. Applications resident on the computing device may be stored on or accessed via a computer readable medium such as memory 903 or mass storage device 909 in some embodiments. Applications may also be in the form of modulated electronic signals modulated accessed via a network modem or other network interface of the computing device. It should be appreciated that CPU 901 may be embodied in a general-purpose processor, a special purpose processor, or a specially programmed logic device in some embodiments.

Display 911 is in communication with CPU 901, memory 903, and mass storage device 907, through bus 905. Display 911 is configured to display any visualization tools or reports associated with the system described herein. Input/output device 909 is coupled to bus 905 in order to communicate information in command selections to CPU 901. It should be appreciated that data to and from external devices may be communicated through the input/output device 909. CPU 901 can be defined to execute the functionality described herein to enable the functionality described with reference to FIGS. 1-8. The code embodying this functionality may be stored within memory 903 or mass storage device 907 for execution by a processor such as CPU 901 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for administration through files in a storage cluster, performed by the storage cluster, comprising:
   distributing user data, including files, throughout a plurality of storage nodes having non-volatile solid-state memory, through erasure coding;
   receiving at the storage cluster a command to write a file or read a file, the file having a filename;
   parsing the filename to determine whether the filename is a reserved filename belonging to a namespace that defines filenames and further defines reserved filenames that trigger administrative actions, the administrative actions comprising at least one of: performing a snapshot, performing a virus check, performing a file backup, performing a file difference summary, generating a report, performing an audit, expiring obsolete data, configuring export points, or culling files;
   determining an administrative action directed by the reserved filename, responsive to determining that the filename is the reserved filename belonging to the namespace; and
   initiating the administrative action.

2. The method of claim 1, wherein:
the filename includes a reserved word; and
the administrative action according to the file is based on the reserved word.

3. The method of claim 1, further comprising:
determining whether the filename includes a parameter, responsive to determining that the filename is reserved, wherein the administrative action is based on the parameter.

4. The method of claim 1, further comprising:
determining whether contents of the file include an instruction, responsive to determining that the filename is reserved, wherein the administrative action is based on the instruction.

5. The method of claim 1, further comprising:
controlling a permission to request the administrative action, via a directory permission.

6. The method of claim 1, further comprising:
intermingling the file having the reserved filename with other files in a directory structure.

7. The method of claim 1, wherein the administrative action includes managing quotas.

8. A plurality of storage nodes in a single chassis, comprising:
the plurality of storage nodes configurable to communicate together as a storage cluster;
each of the plurality of storage nodes having nonvolatile solid-state memory configurable to store files in accordance with a filesystem;
the plurality of storage nodes configurable to distribute the files and metadata associated with the files throughout the plurality of storage nodes such that the plurality of storage nodes maintain ability to read the files, using erasure coding, despite a loss of two of the plurality of storage nodes;
the plurality of storage nodes configurable to determine whether a filename of a file in a command for writing the file to, or reading the file from, the plurality of storage nodes has in the filename a reserved word that indicates the filename is a reserved filename belonging to a namespace that defines filenames and defines reserved filenames that trigger administrative actions comprising at least one of: performing a snapshot, performing a virus check, performing a file backup, performing a file difference summary, generating a report, performing an audit, expiring obsolete data, configuring export points, or culling files; and
the plurality of storage nodes configurable to initiate an administrative action directed by the reserved word, responsive to determining the filename has the reserved word in the filename.

9. The plurality of storage nodes of claim 8, further comprising:
the plurality of storage nodes configurable to determine whether the filename includes a parameter indicating one of formatting, a time value, or a date, wherein the administrative action is further based on the parameter.

10. The plurality of storage nodes of claim 8, further comprising:
the plurality of storage nodes configurable to perform the administrative action on files under a same directory as the file that has the filename including the reserved word, wherein a permission of the directory governs the administrative action.

11. The plurality of storage nodes of claim 8, further comprising:
the plurality of storage nodes configurable to write results of the administrative action to the file.

12. The plurality of storage nodes of claim 8, further comprising:
a network interface controller, configurable to couple at least one of the plurality of storage nodes to a network;
the plurality of storage nodes configurable to provide initiation of the administrative action responsive to receiving the file having the reserved word via the network as one of the files in accordance with the filesystem.

13. The plurality of storage nodes of claim 8, further comprising:
the plurality of storage nodes configurable to unify data access and administrative access over a single authenticated I/O (input output) path.

14. A storage cluster, comprising:
a plurality of storage nodes within a single chassis;
each of the plurality of storage nodes having nonvolatile solid-state memory configurable for file storage per a filesystem;
the plurality of storage nodes configurable to distribute user data and metadata associated with the user data throughout the plurality of storage nodes such that the plurality of storage nodes can access the user data, via erasure coding, with a failure of two of the plurality of storage nodes; and
at least one of the plurality of storage nodes having:
a pathname resolution unit configurable to resolve a pathname for a file and to determine whether a reserved name from a filename namespace defining filenames and reserved names is in a filename of the file, responsive to receiving a command to write the file or to read the file; and
a filesystem processing unit configurable to initiate an administrative action directed by the reserved name, responsive to determining the reserved name from the filename namespace is in the filename, wherein the reserved names trigger administrative actions comprising at least one of: performing a snapshot, performing a virus check, performing a file backup, performing a file difference summary, generating a report, performing an audit, expiring obsolete data, configuring export points, or culling files.

15. The storage cluster of claim 14, further comprising:
the solid-state memory including flash.

16. The storage cluster of claim 14, further comprising:
the pathname resolution unit configurable to process pathnames of incoming files upon arrival of the incoming files at the at least one of the plurality of storage nodes.

17. The storage cluster of claim 14, further comprising:
the pathname resolution unit configurable to crawl for filenames in the filesystem, and configured to find files written to the non-volatile solid-state storage and having reserved words in the filenames.

18. The storage cluster of claim 14, further comprising:
the filesystem processing unit configurable to control the administrative action based on directory permissions in a tenanted directory structure.

19. The storage cluster of claim 14, further comprising:
the filesystem processing unit configurable to prevent the administrative action from applying to files above a directory in which the file having the filename with the reserved name is written.

20. The storage cluster of claim 14, further comprising:
the pathname resolution unit and the filesystem processing unit configurable to determine an aspect of the administrative action from one of a parameter in the filename of the file, or an instruction in contents of the file.

\* \* \* \* \*